(12) United States Patent  
Gady

(10) Patent No.: US 8,555,616 B2  
(45) Date of Patent: Oct. 15, 2013

(54) IDENTIFYING AMMONIA NON-SLIP CONDITIONS IN A SELECTIVE CATALYTIC REDUCTION APPLICATION

(75) Inventor: Kevin Andrew Gady, Ypsilanti, MI (US)

(73) Assignee: GM Global Technology Operations LLC

( * ) Notice: Subject to any disclaimer, the term of this patent is extended or adjusted under 35 U.S.C. 154(b) by 939 days.

(21) Appl. No.: 12/582,234

(22) Filed: Oct. 20, 2009

(65) Prior Publication Data

US 2011/0005203 A1     Jan. 13, 2011

Related U.S. Application Data

(60) Provisional application No. 61/224,254, filed on Jul. 9, 2009.

(51) Int. Cl.
*F01N 3/00*     (2006.01)

(52) U.S. Cl.
USPC ............. 60/286; 60/274; 60/276; 60/295; 60/301; 60/303

(58) Field of Classification Search
USPC .............. 60/274, 276, 286, 295, 301, 303
See application file for complete search history.

(56) References Cited

U.S. PATENT DOCUMENTS 4,751,054 A * 6/1988 Watanabe ................ 422/111

* cited by examiner

*Primary Examiner* — Thomas Denion
*Assistant Examiner* — Diem Tran

(57) ABSTRACT

A system includes a sampling module, a correlation determination module, and an injector control module. The sampling module samples first and second signals that indicate an amount of nitrogen oxides (NOx) upstream and downstream from a selective catalytic reduction (SCR) catalyst, respectively. The second signal further indicates an amount of ammonia downstream from the SCR catalyst when ammonia is released from the SCR catalyst. The correlation determination module determines an amount of correlation between the first and second signals, wherein the amount of correlation indicates a probability that ammonia is released from the SCR catalyst. The injector control module controls an amount of reducing agent injected into the exhaust gas upstream from the SCR catalyst based on the amount of correlation.

16 Claims, 5 Drawing Sheets

IDENTIFYING AMMONIA NON-SLIP CONDITIONS IN A SELECTIVE CATALYTIC REDUCTION APPLICATION

CROSS-REFERENCE TO RELATED APPLICATIONS

This application claims the benefit of U.S. Provisional Application No. 61/224,254, filed on Jul. 9, 2009. The disclosure of the above application is incorporated herein by reference in its entirety.

FIELD

The present disclosure relates to emission control systems, and more particularly to determining a probability of ammonia slip in a selective catalytic reduction system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines emit exhaust gas that includes carbon monoxide (CO), hydrocarbons (HC), and nitrogen oxides (NOx). An exhaust treatment system reduces the levels of CO, HC, and NOx in the exhaust gas. The exhaust treatment system may include an oxidation catalyst (OC) (e.g., a diesel OC), a particulate filter (PF) (e.g., a diesel PF), and a selective catalytic reduction (SCR) system. The OC oxidizes CO and HC to form carbon dioxide and water. The PF removes particulate matter from the exhaust gas. The SCR system reduces NOx.

The SCR system injects a reducing agent (e.g., urea) into the exhaust gas upstream from an SCR catalyst. The reducing agent forms ammonia that reacts with NOx in the SCR catalyst. The reaction of ammonia and NOx in the SCR catalyst reduces the NOx and results in the emission of diatomic nitrogen and water. When excess reducing agent is injected into the exhaust gas, the excess reducing agent may form excess ammonia that passes through the SCR catalyst without reacting.

SUMMARY

A system comprises a sampling module, a correlation determination module, and an injector control module. The sampling module samples first and second signals that indicate an amount of nitrogen oxides (NOx) upstream and downstream from a selective catalytic reduction (SCR) catalyst, respectively. The second signal further indicates an amount of ammonia downstream from the SCR catalyst when ammonia is released from the SCR catalyst. The correlation determination module determines an amount of correlation between the first and second signals, wherein the amount of correlation indicates a probability that ammonia is released from the SCR catalyst. The injector control module controls an amount of reducing agent injected into the exhaust gas upstream from the SCR catalyst based on the amount of correlation.

A method comprises sampling first and second signals that indicate an amount of nitrogen oxides (NOx) upstream and downstream from a selective catalytic reduction (SCR) catalyst, respectively. The second signal further indicates an amount of ammonia downstream from the SCR catalyst when ammonia is released from the SCR catalyst. The method further comprises determining an amount of correlation between the first and second signals, wherein the amount of correlation indicates a probability that ammonia is released from the SCR catalyst. Additionally, the method comprises controlling an amount of reducing agent injected into the exhaust gas upstream from the SCR catalyst based on the amount of correlation.

BRIEF DESCRIPTION OF THE DRAWINGS

The present disclosure will become more fully understood from the detailed description and the accompanying drawings, wherein.

DETAILED DESCRIPTION

Figure 1:
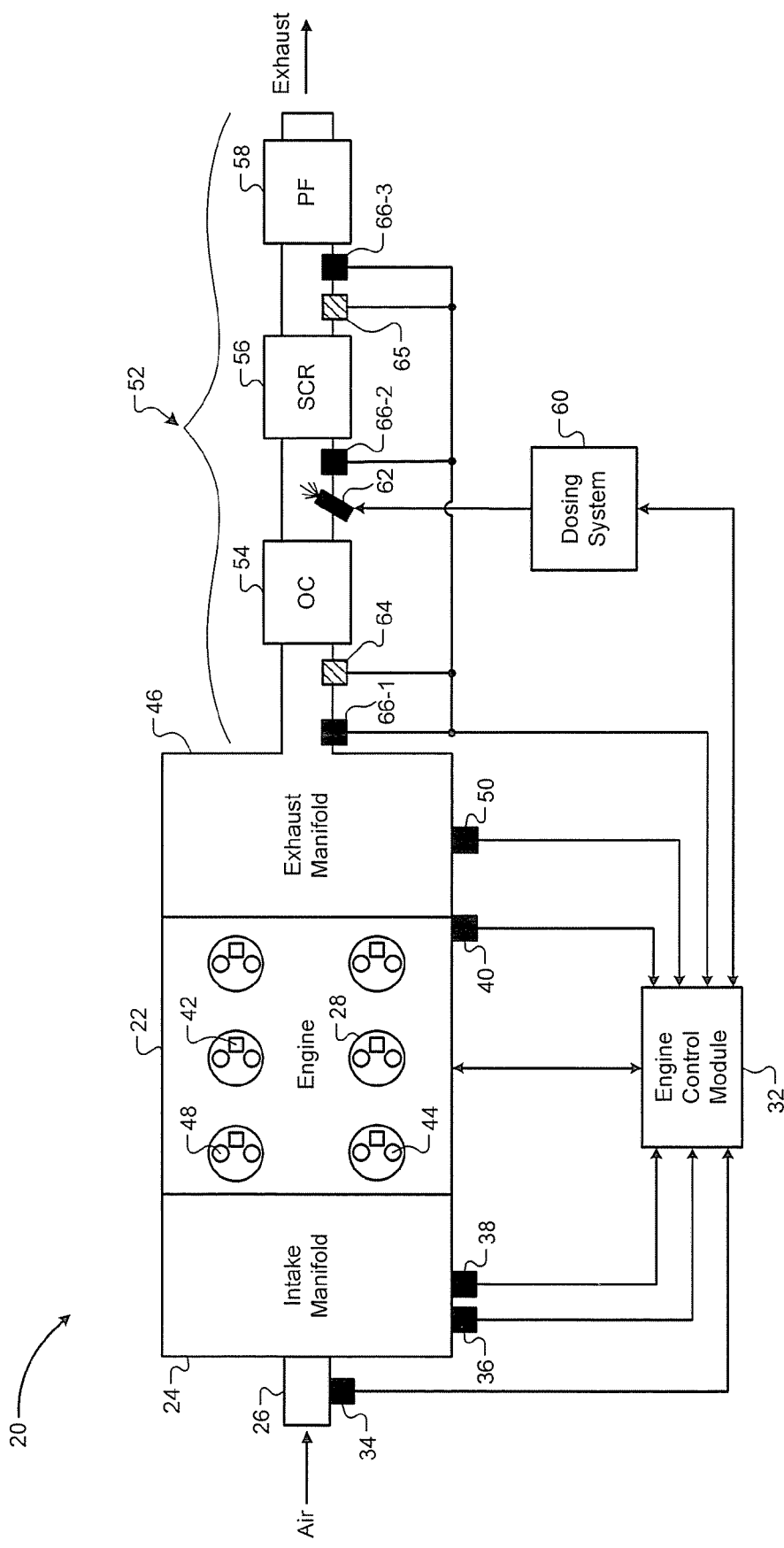
FIG. 1 is a functional block diagram of an engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit that provide the described functionality.

A selective catalytic reduction (SCR) system includes a reducing agent injector that injects a reducing agent into exhaust gas to form ammonia ($NH_3$). $NH_3$ may be released from the SCR system, for example, when the reducing agent injector injects excess reducing agent or when the temperature of the SCR system increases. Release of $NH_3$ from the SCR system may be referred to hereinafter as "$NH_3$ slip."

A slip detection system according to the present disclosure determines a probability that $NH_3$ slip is occurring. The slip detection system may sample signals from nitrogen oxide (NOx) sensors that indicate an amount of nitrogen oxides upstream and downstream from the SCR catalyst. The NOx sensor downstream from the SCR catalyst may also indicate an amount of $NH_3$ released from the SCR system when $NH_3$ slip is occurring. The slip detection system may determine the probability that $NH_3$ slip is occurring based on an amount of correlation between the signals from the NOx sensors upstream and downstream from the SCR catalyst. Accordingly, the slip detection system may control an amount of reducing agent injected into the SCR system based on the amount of correlation in order to increase efficiency of the SCR catalyst and avoid the risk of $NH_3$ slip.

Referring now to FIG. 1, an engine system 20 (e.g., a diesel engine system) includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28. Although a compression ignition engine is illustrated, a spark ignition engine is also contemplated.

The engine system 20 includes an engine control module (ECM) 32 that communicates with components of the engine system 20. The components may include the engine 22, sensors, and actuators as discussed herein. The ECM 32 may implement the slip detection system of the present disclosure.

Air is passed from the inlet 26 through a mass airflow (MAF) sensor 34. The MAF sensor 34 generates a MAF signal that may indicate a mass of air flowing into the intake manifold 24. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal that indicates intake air temperature.

An engine crankshaft (not shown) rotates at engine speed or a rate that is proportional to engine speed. A crankshaft sensor 40 generates a crankshaft position (CSP) signal. The CSP signal may indicate the rotational speed and position of the crankshaft.

The ECM 32 actuates fuel injectors 42 to inject fuel into the cylinders 28. An intake valve 44 selectively opens and closes to enable air to enter the cylinder 28. An intake camshaft (not shown) regulates a position of the intake valve 44. A piston (not shown) compresses and combusts the air/fuel mixture within the cylinder 28. Alternatively, the air/fuel mixture may be ignited using a spark plug in a spark ignition engine. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates a position of the exhaust valve 48. An exhaust manifold pressure (EMP) sensor 50 generates an EMP signal that indicates exhaust manifold pressure.

An exhaust treatment system 52 may treat the exhaust gas. The exhaust treatment system 52 may include an oxidation catalyst (OC) 54 (e.g., a diesel OC), an SCR catalyst 56 (hereinafter "SCR 56"), and a particulate filter (PF) 58 (e.g., a diesel PF). The OC 54 oxidizes carbon monoxide and hydrocarbons in the exhaust gas. The SCR 56 uses a reducing agent to reduce NOx in the exhaust gas. The PF 58 removes particulate matter in the exhaust gas.

The engine system 20 includes a dosing system 60. The dosing system 60 stores the reducing agent. For example, the reducing agent may include a urea/water solution. The ECM 32 actuates the dosing system 60 and a reducing agent injector 62 (hereinafter "injector 62") to control an amount of the reducing agent injected into the exhaust gas upstream of the SCR 56.

The reducing agent injected into the exhaust gas may form $NH_3$ when injected into the exhaust gas. Accordingly, the ECM 32 controls an amount of $NH_3$ supplied to the SCR 56. The SCR 56 adsorbs (i.e., stores) $NH_3$. The amount of $NH_3$ stored by the SCR 56 may be referred to hereinafter as an "$NH_3$ storage level." The ECM 32 may control the amount of $NH_3$ supplied to the SCR 56 to regulate the $NH_3$ storage level. $NH_3$ stored in the SCR 56 reacts with NOx in the exhaust gas passing through the SCR 56.

The exhaust treatment system 52 may include a first NOx sensor 64 and a second NOx sensor 65. Each NOx sensor 64, 65 generates a NOx signal that indicates an amount of NOx in the exhaust gas. The first NOx sensor 64 may be positioned upstream from the injector 62 and may indicate the amount of NOx entering the SCR 56. The signal generated by the first NOx sensor 64 may be called a $NOX_{in}$ signal. The second NOx sensor 65 may be positioned downstream from the SCR 56 and may indicate the amount of NOx exiting the SCR 56. The signal generated by the second NOx sensor 65 may be called a $NOX_{out}$ signal.

The percentage of NOx that is removed from the exhaust gas entering the SCR 56 may be referred to as a conversion efficiency of the SCR 56. The ECM 32 may determine the conversion efficiency of the SCR 56 based on the $NOX_{in}$ and $NOX_{out}$ signals. For example, the ECM 32 may determine the conversion efficiency of the SCR 56 based on the following equation:

$$\text{Efficiency}_{SCR} = \frac{NOx_{in} - NOx_{out}}{NOx_{in}} \quad \text{(Eq. 1)}$$

where $\text{Efficiency}_{SCR}$ represents the conversion efficiency of the SCR 56, and $NOx_{in}$ and $NOx_{out}$ represent the amount of NOx indicated by the $NOx_{in}$ and $NOx_{out}$ signals, respectively.

The conversion efficiency of the SCR 56 may be related to the amount of $NH_3$ stored in the SCR 56. Accordingly, the ECM 32 may control the amount of reducing agent injected into the exhaust gas to control the conversion efficiency of the SCR 56. Maintaining the $NH_3$ storage level of the SCR 56 near a maximum $NH_3$ storage level ensures that a maximum conversion efficiency is achieved. However, maintaining the $NH_3$ storage level at or near the maximum $NH_3$ storage level also increases the possibility of $NH_3$ slip. The second NOx sensor 65 is cross-sensitive to $NH_3$. Accordingly, the $NOx_{out}$ signal may indicate both the amount of NOx and the amount of $NH_3$ in the exhaust gas flowing out of the SCR 56.

An increase in the temperature of the SCR 56 may cause $NH_3$ slip. For example, $NH_3$ may desorb from the SCR 56 when the temperature of the SCR 56 increases at times when the $NH_3$ storage level is near to the maximum $NH_3$ storage level. $NH_3$ slip may also occur due to an error (e.g., storage level estimation error) or faulty component (e.g., faulty injector) in the exhaust treatment system 52.

The engine system 20 may include exhaust temperature sensors 66-1, 66-2, and 66-3 (collectively exhaust temperature sensors 66). Each of the exhaust temperature sensors 66 generates exhaust temperature signals that indicate a temperature of the exhaust gas. The ECM 32 may determine the temperature of the SCR 56 based on the exhaust temperature signals. While three temperature sensors 66 are shown in FIG. 1, the engine system 20 may include more or less than three exhaust temperature sensors 66.

Figure 2:
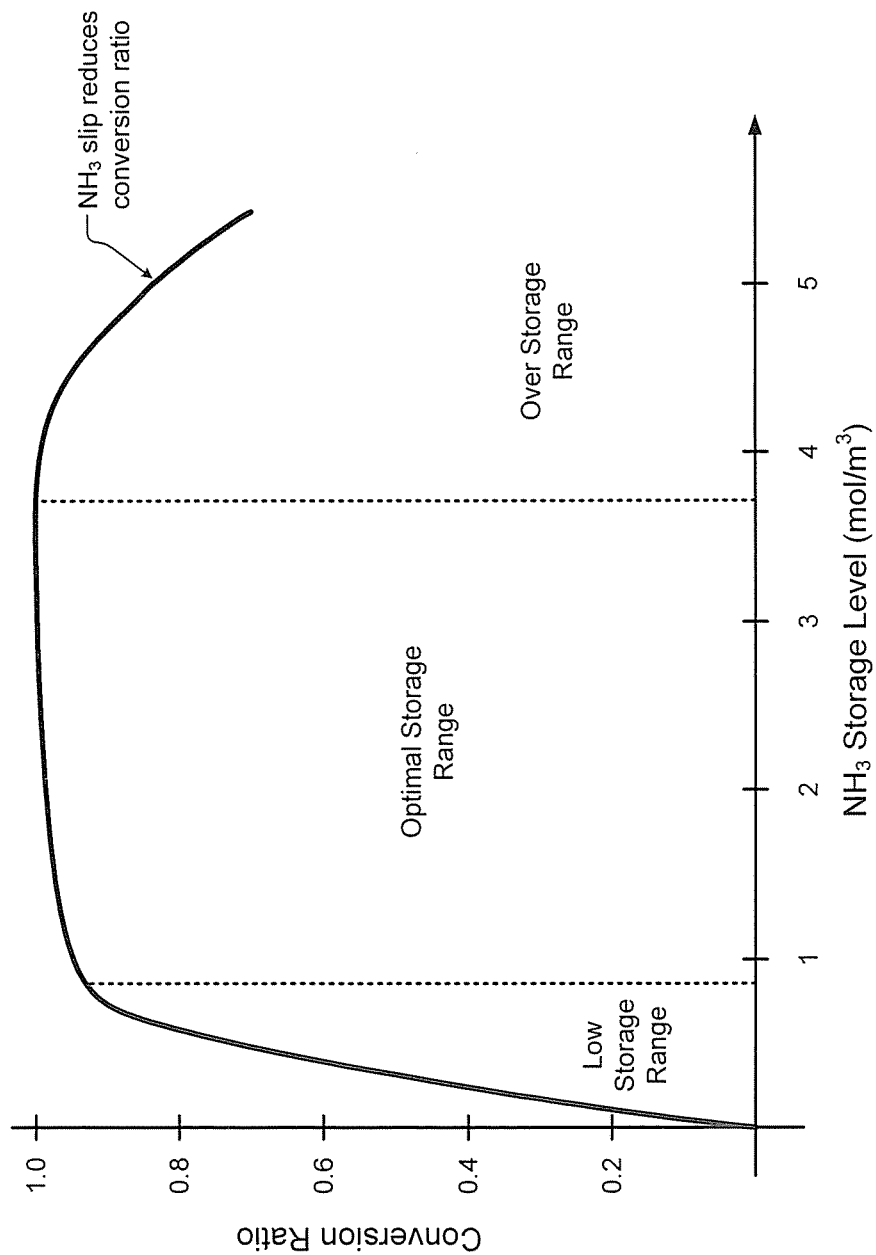
FIG. 2 is a graph that illustrates a selective catalytic reduction (SCR) system conversion ratio according to the present disclosure.

Referring now to FIG. 2, an exemplary relationship between a conversion ratio ($\eta$) of the SCR 56 and the $NH_3$ storage level of the SCR 56 is shown. The $NH_3$ storage level may be divided into three storage ranges: a low storage range, an optimal storage range, and an over storage range. The conversion ratio may be based on the $NOx_{in}$ and $NOx_{out}$ signals. For example, the conversion ratio may be expressed by the following equation:

$$\eta = \frac{NOx_{in} - NOx_{out} - NOx_{SLIP}}{NOx_{in}} \quad \text{(Eq. 2)}$$

where $NOx_{SLIP}$ represents a component of the $NOx_{out}$ signal due to $NH_3$ slip. Accordingly, the detection of $NH_3$ by the second NOx sensor 65 may decrease the conversion ratio.

The conversion ratio may represent conversion efficiency and/or an amount of $NH_3$ slip depending on the $NH_3$ storage level. The conversion ratio may represent the conversion efficiency of the SCR 56 when the $NH_3$ storage level is in the low storage range and the optimal storage range. For example, the conversion efficiency of the SCR 56 may be low (e.g., near zero) when the $NH_3$ storage level is low (e.g., near zero). The conversion efficiency, and accordingly the conversion ratio, of the SCR 56 may increase to a maximum of 1 as the $NH_3$ storage level increases towards the over storage range.

$NH_3$ slip may not occur in the low and optimal storage ranges because the injected $NH_3$ is adsorbed by the SCR 56 and/or reacts with NOx. Therefore, the $NOx_{out}$ signal primarily reflects NOx in the exhaust gas and little or no $NH_3$. As the $NH_3$ storage level increases from the low storage range to the optimal storage range, the $NOx_{out}$ signal decreases relative to the $NOx_{in}$ signal (i.e., the conversion efficiency increases).

When the $NH_3$ storage level increases into the over storage range, the conversion ratio may represent the amount of $NH_3$ slip. For example, the $NOx_{out}$ signal may increase in magnitude due to the detection of both $NH_3$ and NOx while the magnitude of the $NOx_{in}$ signal indicates only NOx. Accordingly, the increase in the magnitude of the $NOx_{out}$ signal may result in a decrease of the conversion ratio when the $NH_3$ storage level is in the over storage range.

Figure 3:
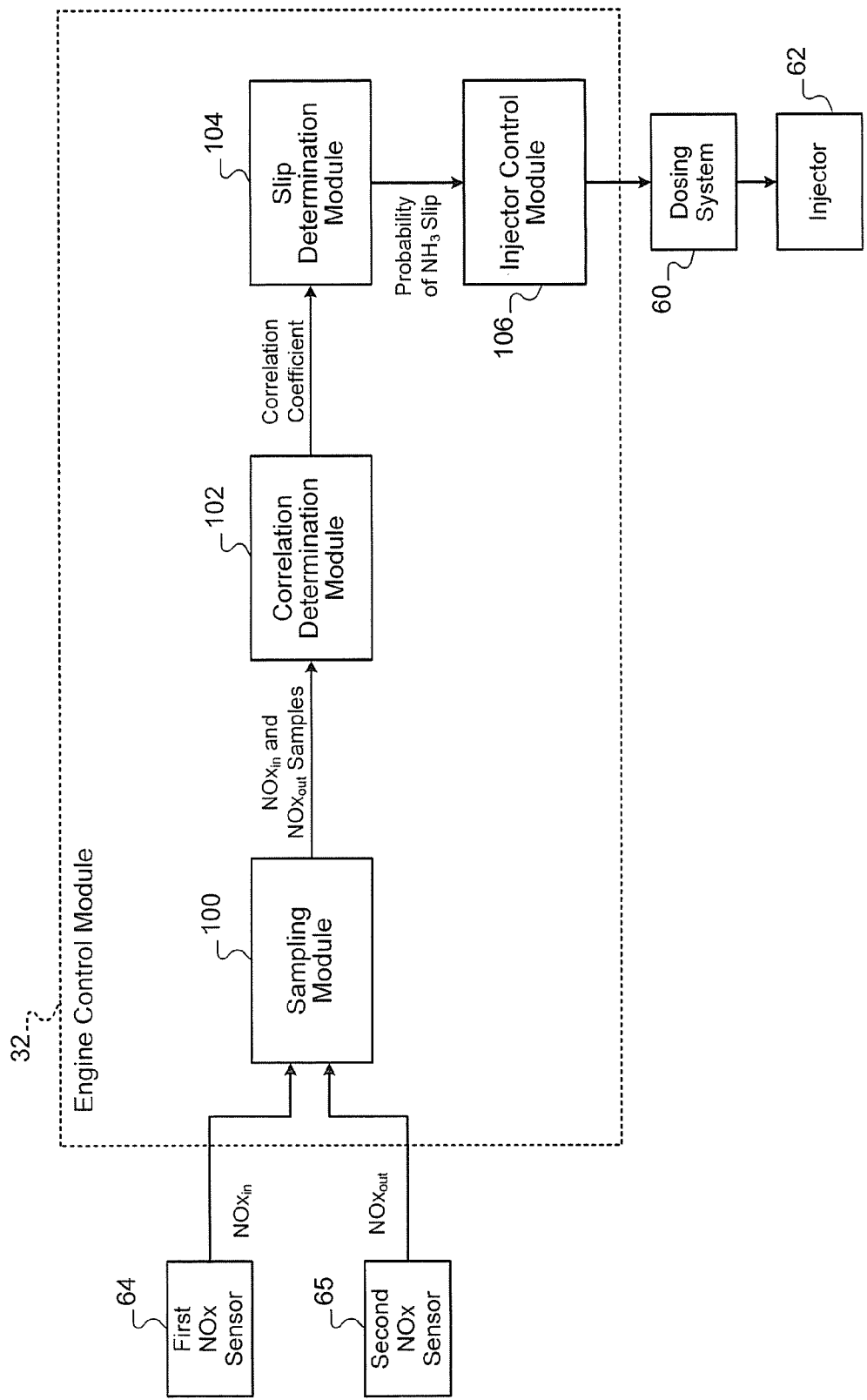
FIG. 3 is a functional block diagram of an engine control module according to the present disclosure.

Referring now to FIG. 3, the ECM 32 includes a sampling module 100, a correlation determination module 102, a slip determination module 104, and an injector control module 106. The ECM 32 receives input signals from the engine system 20. The input signals include, but are not limited to, the MAF, MAP, IAT, CSP, EMP, exhaust temperature, and NOx signals. The ECM 32 processes the input signals and generates timed engine control commands that are output to the engine system 20. The engine control commands may actuate the fuel injectors 42, the dosing system 60, and the injector 62.

The sampling module 100 receives the $NOx_{in}$ and $NOx_{out}$ signals from the first and second NOx sensors 64, 65, respectively. The sampling module 100 samples the $NOx_{in}$ and $NOx_{out}$ signals for a sampling period. The correlation determination module 102 determines the amount of correlation between the $NOx_{in}$ and $NOx_{out}$ signals during the sampling period. The slip determination module 104 determines the probability that $NH_3$ slip is occurring based on the amount of correlation. The injector control module 106 controls the dosing system 60 and the injector 62 based on the probability that $NH_3$ slip is occurring.

The sampling module 100 may sample the $NOx_{in}$ and $NOx_{out}$ signals at a predetermined sample rate for the sampling period. For example only, the predetermined sample rate may include 1 Hz and the sampling period may be 100 seconds.

Figure 4A:
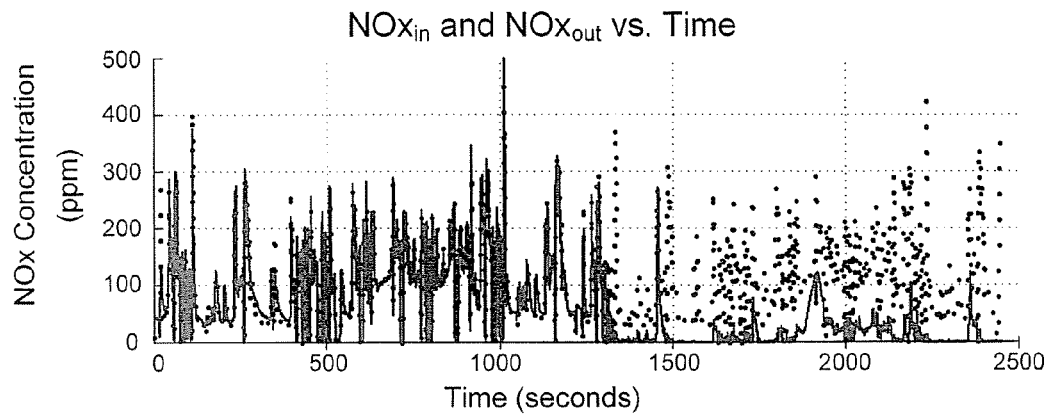
FIG. 4A illustrates signals that indicate an amount of nitrogen oxides corresponding to an input to the SCR system and an output of the SCR system.
Figure 4B:
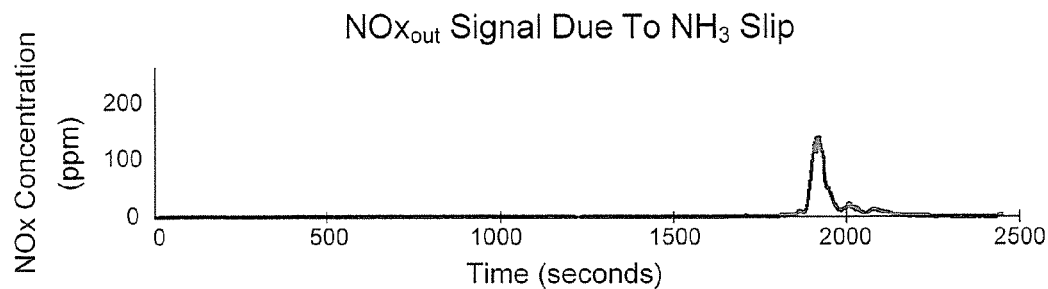
FIG. 4B illustrates ammonia slip of the SCR system.
Figure 4C:
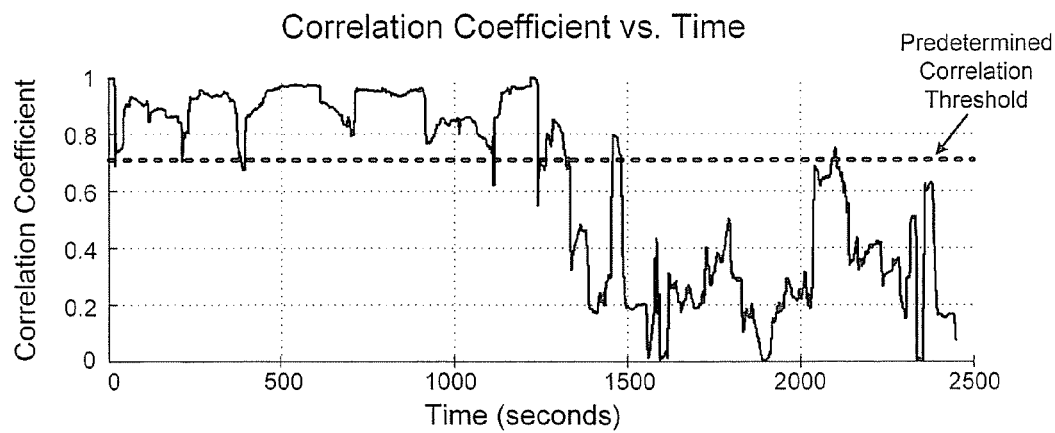
FIG. 4C illustrates an amount of correlation between the signals that indicate the amount of nitrogen oxides corresponding to the input to the SCR system and the output of the SCR system according to the present disclosure.

Referring now to FIGS. 4A-4C, exemplary sampled NOx signals, $NH_3$ slip corresponding to the sampled NOx signals, and a correlation coefficient corresponding to the sampled NOx signals are shown. Referring now to FIG. 4A, exemplary sampled NOx signals are illustrated. The data points (i.e. dotted line) represent the sampled $NOx_{in}$ signal. The $NOx_{in}$ signal may indicate the amount of NOx in the exhaust gas upstream from the SCR 56. The solid line represents the sampled $NOx_{out}$ signal. Accordingly, the sampled $NOx_{out}$ signal may indicate the amount of NOx and/or $NH_3$ in the exhaust gas downstream from the SCR 56.

The sampled NOx signals of FIG. 4A may represent operation of the engine system 20 without injection of the reducing agent during a first period, followed by injection of the reducing agent during a second period. For example, the engine system 20 may have had the injector 62 turned off (i.e., no reducing agent injected) from 0 seconds to approximately 1250 seconds. The engine system 20 may have had the injector 62 turned on (i.e., reducing agent injected) from approximately 1250 seconds until 2500 seconds. The spike in the $NOx_{out}$ signal (solid line) that occurs between approximately 1800-2000 seconds may be due to $NH_3$ slip.

Referring now to FIG. 4B, a portion of the $NOx_{out}$ signal due to $NH_3$ slip is illustrated. $NH_3$ slip occurs during approximately 1800 to 2100 seconds. The $NOx_{out}$ sensor may not distinguish between $NH_3$ and NOx. Accordingly, the $NOx_{out}$ concentration data of FIG. 4B may have been determined based on an $NH_3$ sensor measuring actual $NH_3$ slip in parallel with the $NOx_{out}$ sensor.

Referring now to FIG. 4C, the correlation determination module 102 may determine the amount of correlation between the $NOx_{in}$ and $NOx_{out}$ signals during the sampling period. The correlation determination module 102 may determine a correlation coefficient that corresponds to how well the $NOx_{in}$ and $NOx_{out}$ signals are correlated. In some implementations, the correlation coefficient may be a statistical measure of the strength and direction of a linear relationship between the $NOx_{in}$ and $NOx_{out}$ signals. For example only, the correlation determination module 102 may determine the correlation coefficient based on the following equation:

$$\text{Corr}(NOx_{in}, NOx_{out}) = \frac{\text{Cov}(NOx_{in}, NOx_{out})}{\sigma_{in} \cdot \sigma_{out}} \quad \text{(Eq. 3)}$$

where $\text{Corr}(NOx_{in}, NOx_{out})$ is the correlation coefficient and $\text{Cov}(NOx_{in}, NOx_{out})$ is a covariance of the NOx signals. $\sigma_{in}$ and $\sigma_{out}$ represent a standard deviation of the $NOx_{in}$ and $NOx_{out}$ signals, respectively, during the sampling period.

The correlation determination module 102 may determine the covariance based on the following equation:

$$\text{Cov} = \left( NOx_{in,i} - \frac{1}{n} \cdot \sum_{i-n}^{i} (NOx_{in,i}) \right) \cdot \left( NOx_{out,i} - \frac{1}{n} \cdot \sum_{i-n}^{i} (NOx_{out,i}) \right) \quad \text{(Eq. 4)}$$

where Cov is the covariance of the NOx signals. Covariance may be a measure of how much the $NOx_{in}$ and $NOx_{out}$ signals change together. n may indicate a size of a sample window (e.g., a number of samples taken for each of the NOx signals), i may be a counting variable.

The correlation coefficient may be a value between 0 and 1. A correlation coefficient of 1 may indicate a high correlation between the NOx signals. For example, a correlation coefficient of 1 may correspond to when the $NOx_{in}$ and $NOx_{out}$ signals move identically together. A correlation coefficient of 0 may indicate a low correlation between the NOx signals.

For example, if the $NOx_{in}$ and $NOx_{out}$ signals act independently, the correlation coefficient may be 0.

The correlation coefficient may be near 1 when the $NH_3$ storage level is in the low storage range since $NOx_{out}$ approximately follows $NOx_{in}$ when the $NH_3$ storage level is low. The correlation coefficient may decrease when the $NH_3$ storage level increases from the low storage range to the optimum storage range since the $NOx_{out}$ signal may not follow the $NOx_{in}$ signal in the optimum storage range. The correlation coefficient may also decrease when the $NH_3$ storage level increases into the over storage range since NOx may be reduced in the SCR 56 and the $NOx_{out}$ signal may indicate $NH_3$ released from the SCR 56.

The slip determination module 104 may determine the probability that $NH_3$ slip is occurring based on the correlation coefficient and a predetermined correlation threshold. The predetermined correlation threshold may be set according to measured properties of the engine system 20, particularly properties that affect the conversion ratio of the SCR 56. The correlation coefficient may be greater than the predetermined correlation threshold when the $NH_3$ storage level is in the low storage range since $NOx_{out}$ approximately follows $NOx_{in}$ when the $NH_3$ storage level is low. Accordingly, the slip determination module 104 may determine that the probability of $NH_3$ slip is low when the correlation coefficient is greater than the predetermined correlation threshold. The correlation coefficient may be less than the predetermined correlation threshold when the $NH_3$ storage level increases from the low storage range to the optimum/over storage range since the $NOx_{out}$ signal may not follow the $NOx_{in}$ signal in the optimum/over storage range. Accordingly, the slip determination module may determine that the probability of $NH_3$ slip is greater when the correlation coefficient is less than the predetermined correlation threshold.

Referring now to FIG. 4C, an exemplary predetermined correlation threshold may be approximately 0.7. The slip determination module 104 may determine that the $NH_3$ storage level is in the low storage range when the correlation coefficient is greater than 0.7. Accordingly, the slip determination module 104 may determine that the probability of $NH_3$ slip is low when the correlation coefficient is greater than 0.7. The slip determination module 104 may determine that the $NH_3$ storage level is in the optimum or the over storage range when the correlation coefficient is less than 0.7. Accordingly, the slip determination module 104 may determine that the probability of $NH_3$ slip is greater when the correlation coefficient is less than 0.7.

For example, the slip determination module 104 may determine that the probability of $NH_3$ slip is low when the correlation coefficient is greater than the predetermined correlation threshold for a predetermined length of time. Additionally, the slip determination module 104 may determine that the probability of $NH_3$ slip is high when the correlation coefficient is less than the predetermined correlation threshold for the predetermined length of time.

The injector control module 106 may control the injector 62 based on the probability of $NH_3$ slip. For example, when the probability of $NH_3$ slip is low (i.e., the correlation coefficient is greater than the predetermined correlation threshold) it is likely that the storage level may be in the low storage range. Accordingly, the injector control module 106 may inject the reducing agent to store more $NH_3$ in the SCR 56 when the probability of $NH_3$ slip is low. When the probability of $NH_3$ slip is high (i.e., the correlation coefficient is less than the predetermined correlation threshold) it is likely that the storage level may be in the optimal storage range or the over storage range. Accordingly, the injector control module 106 may not inject the reducing agent in order to prevent $NH_3$ slip when the probability of $NH_3$ slip is high.

Figure 5:
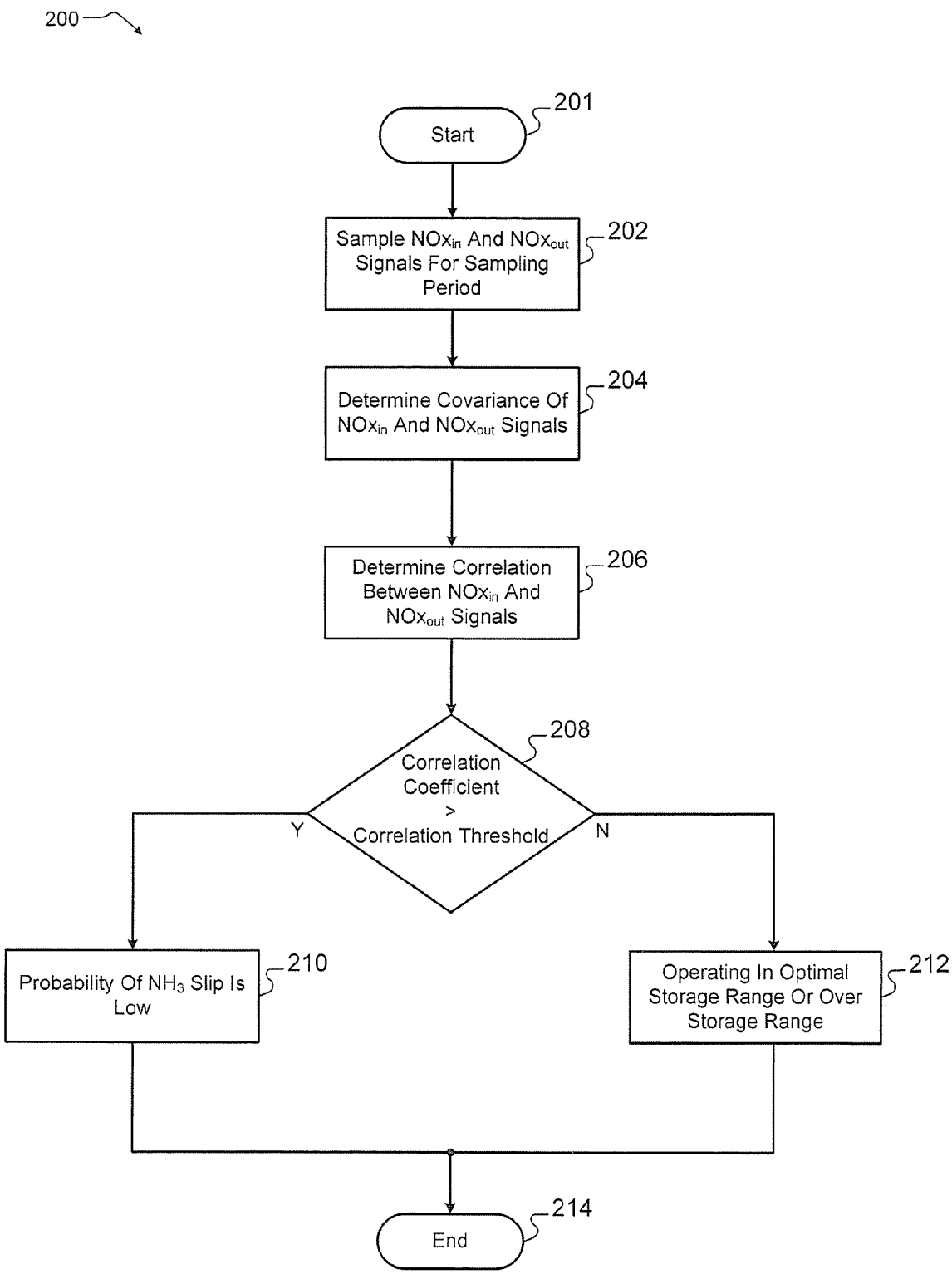
FIG. 5 is a flow diagram that illustrates a method for determining a probability of ammonia slip according to the present disclosure.

Referring now to FIG. 5, a method 200 for determining a probability of $NH_3$ slip starts in step 201. In step 202, the sampling module 100 samples the $NOx_{in}$ and $NOx_{out}$ signals for the sampling period. In step 204, the correlation determination module 102 determines the covariance of the $NOX_{in}$, and $NOX_{out}$ signals. In step 206, the correlation determination module 102 determines the correlation between the $NOx_{in}$ and $NOx_{out}$ signals. In step 208, the slip determination module 104 determines whether the correlation coefficient is greater than the predetermined correlation threshold. If the result of step 208 is true, the method 200 continues with step 210. If the result of step 208 is false, the method 200 continues with step 212. In step 210, the slip determination module 104 determines that the probability of $NH_3$ slip is low. In step 212, the slip determination module 104 determines that the SCR 56 is operating in the optimal storage range or the over storage range. The method 200 ends in step 214.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a sampling module that samples first and second signals that indicate an amount of nitrogen oxides (NOx) upstream and downstream from a selective catalytic reduction (SCR) catalyst, respectively, wherein the second signal further indicates an amount of ammonia downstream from the SCR catalyst when ammonia is released from the SCR catalyst;
    a correlation determination module that determines an amount of correlation between the first and second signals, wherein the amount of correlation indicates a probability that ammonia is released from the SCR catalyst;
    a control module that determines an amount of ammonia stored in the SCR catalyst based on the amount of correlation between the first and second signals; and
    an injector control module that controls an amount of reducing agent injected into the exhaust gas upstream from the SCR catalyst based on the amount of correlation.

2. The system of claim 1 wherein the amount of correlation between the first and second signals is a statistical correlation.

3. The system of claim 1 wherein the injector control module controls the amount of reducing agent injected into the exhaust gas to increase the amount of ammonia stored when the amount of correlation between the first and second signals is greater than a predetermined correlation threshold.

4. The system of claim 1 wherein the correlation determination module determines a correlation coefficient that corresponds to the amount of correlation between the first and second signals.

5. The system of claim 4 wherein the correlation coefficient is a statistical measure of strength and direction of a linear relationship between the first and second signals.

6. The system of claim 4 wherein the correlation determination module determines the correlation coefficient based on a covariance of the first and second signals, a standard deviation of samples of the first signal, and a standard deviation of samples of the second signal.

7. The system of claim 4 wherein the injector control module determines that ammonia is not being released from the SCR catalyst when the amount of correlation is greater than a predetermined correlation threshold.

8. The system of claim 7 wherein the injector control module controls the amount of reducing agent injected into the exhaust gas to increase an amount of ammonia stored in the SCR catalyst when the amount of correlation is greater than the predetermined correlation threshold.

9. A method comprising:
sampling first and second signals that indicate an amount of nitrogen oxides (NOx) upstream and downstream from a selective catalytic reduction (SCR) catalyst, respectively, wherein the second signal further indicates an amount of ammonia downstream from the SCR catalyst when ammonia is released from the SCR catalyst;
determining an amount of correlation between the first and second signals, wherein the amount of correlation indicates a probability that ammonia is released from the SCR catalyst;
determining an amount of ammonia stored in the SCR catalyst based on the amount of correlation between the first and second signals; and
controlling an amount of reducing agent injected into the exhaust gas upstream from the SCR catalyst based on the amount of correlation.

10. The method of claim 9 wherein the amount of correlation between the first and second signals is a statistical correlation.

11. The method of claim 9 further comprising controlling the amount of reducing agent injected into the exhaust gas to increase the amount of ammonia stored when the amount of correlation between the first and second signals is greater than a predetermined correlation threshold.

12. The method of claim 9 further comprising determining a correlation coefficient that corresponds to the amount of correlation between the first and second signals.

13. The method of claim 12 wherein the correlation coefficient is a statistical measure of strength and direction of a linear relationship between the first and second signals.

14. The method of claim 12 further comprising determining the correlation coefficient based on a covariance of the first and second signals, a standard deviation of samples of the first signal, and a standard deviation of samples of the second signal.

15. The method of claim 12 further comprising determining that ammonia is not being released from the SCR catalyst when the amount of correlation is greater than a predetermined correlation threshold.

16. The method of claim 15 further comprising controlling the amount of reducing agent injected into the exhaust gas to increase an amount of ammonia stored in the SCR catalyst when the amount of correlation is greater than the predetermined correlation threshold.

* * * * *